United States Patent Office 3,434,542
Patented Mar. 25, 1969

3,434,542
WATERFLOOD PROCESS EMPLOYING SURFACTANT AND GRADED VISCOSITY
Billy J. Dotson, Grand Prairie, and Carl Connally, Jr., Dallas, Tex., assignors to Mobil Oil Corporation, a corporation of New York
No Drawing. Filed Oct. 9, 1967, Ser. No. 673,944
Int. Cl. E21b 43/20
U.S. Cl. 166—273          13 Claims

ABSTRACT OF THE DISCLOSURE

This specification discloses an improvement in a method of waterflooding a subterranean formation to recover oil therefrom. The improvement comprises employing a surfactant solution to improve the microscopic displacement efficiency and a solution of a thickening agent to alleviate premature breakthrough. The surfactant is a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight greater than 590. The thickening agent is the heteropolysaccharide designated polysaccharide B-1459. The polysaccharide B-1459 is employed in diminishing concentrations to provide a graded viscosity between that of the oil and that of the flooding water.

BACKGROUND OF THE INVENTION

This invention pertains to recovering liquid petroleum hydrocarbons, more commonly called oil, from a subterranean formation. More particularly, it pertains to a method of recovering oil by injecting water through an injection well into the formation to displace the oil therein so that it may be recovered from a production well leading from the surface of the earth to the formation.

Oil accumulated within a subterranean formation can be recovered, or produced, through wells from the formation using the natural energy within the formation. However, producing operations deplete the natural energy relatively rapidly. Thus, a large amount of the oil is left in a subterranean formation if only the natural energy is used to produce the oil. This production by depletion of the natural energy is often referred to as primary production. Where natural formation energy is inadequate or has become depleted, supplemental operations, often referred to as secondary recovery operations, are used to recover a greater portion of the oil. In a successful and widely used supplemental recovery operation, a fluid is injected through an injection means, comprising one or more injection wells. The fluid passes into the formation, displacing oil within and moving it through the formation. The oil is produced from production means, comprising one or more production wells, as the injected fluid passes from the injection means toward the production means. In a particular recovery operation of this sort, water is employed as the injected fluid, and the operation is referred to as waterflooding. The injected water is referred to as the flooding water as distinguished from the in situ, or connate, water.

Although conventional waterflooding is effective in obtaining additional oil from an oil-containing subterranean formation, it has a number of shortcomings.

One of the shortcomings of waterflooding is the relatively poor microscopic displacement of the oil from within the interstices of the subterranean formation by the water. The microscopic displacement may be expressed as the microscopic sweep efficiency, which is defined in percent as the ratio of the amount of oil displaced from the pore space of the formation through which the flooding water has passed to the original amount of oil therein. The relatively poor microscopic displacement is due to the property of immiscibility which the flooding water has with the oil it seeks to displace. There is a relatively high interfacial tension between the water and the oil. The interface between the two liquids is an interfacial zone analogous to a film that, because of appreciable interfacial tension, is prevented from moving through the micropores to displace the oil therefrom. Regardless, there is a relationship between the microscopic displacement efficiency of a flooding water and the interfacial tension between the flooding water and the oil it seeks to displace, the displacement efficiency decreasing with increasing interfacial tension.

A second shortcoming of waterflooding is know as premature breakthrough. Premature breakthrough is defined as the production of the flooding water at a production well before the oil displaced from within the formation ahead of the flooding water has been produced. Premature breakthrough reduces the areal or macroscopic sweep efficiency of the waterflood in proportion to the degree of prematurity. The primary causes of premature breakthrough are permeability stratification and the tendency of the more mobile flooding water to "finger" through a subterranean formation containing less-mobile oil. In effect, the flooding water bypasses substantial portions of the oil. By fingering is meant the developing, in the flooding front, of unstable bulges or stringers which advance toward the production means more rapidly than the remainder of the flooding front. The fingering and bypassing tendencies of the water are more or less directly related to the ratio of the viscosity of the oil to the viscosity of the flooding water. The viscosities of different oils vary from as low as 1 or 2 centipoises to 1,000 centipoises, or higher. Water has a viscosity of about 1 centipoise.

The art is replete with suggestions for curing both the relatively poor microscopic displacement and the premature breakthrough of waterfloods. Past suggestions for improving microscopic displacement of the flooding water have included incorporating water-soluble surfactants in the flooding water. Past suggestions for alleviating the adverse effects of premature breakthrough have included increasing the viscosity of the flooding water by incorporating water-soluble thickeners in the flooding water. Such thickeners have included some polysaccharides. There has been at least one suggestion to include specific thickeners with specific surfactants in the flooding water. Despite using the suggestions, much oil continues to remain in a subterranean formation when a waterflood has reached its economic limit, i.e., when the expense of treating and recirculating the water produced with the oil becomes equal to or exceeds the value of the additional oil recovered.

Summary of the invention

The invention provides an improvement in the method of recovering oil from an oil-containing subterranean formation in which a surfactant solution, a solution of thickening agent, and flooding water are injected through an injection well into the subterranean formation and oil is produced through a production well from the subterranean formation. The improvement comprises injecting into the formation a specific solution of surfactant and a specific solution of thickening agent with the specific solution of thickening agent having a diminishng concentration of the thickening agent. The specific solution of surfactant is a solution of a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight greater than 590. This solution contains the petroleum sulfonates in a concentration sufficiently high to effect an interfacial tension below 0.1 dyne per centimeter between the oil in the formation and a displacing aqueous phase. The specific solution of thickening agent is an aqueous solution of a heteropolysaccharide, designated polysaccharide B–1459, derived by the action of bacterium *Xanthomonas campestris* NRRL B–1459, Northern Regional Research Laboratory, Peoria, Ill. United States Department of Agriculture, on glucose. The solution of thickening agent as injected through the injection well into the subterranean formation contains diminishing concentrations of the heteropolysaccharide to effect a diminishing viscosity ranging from the viscosity of the oil in the formation to the viscosity of the flooding water.

Employing the specific solution of surfactant and employing the specific solution of thickening agent achieves a surprisingly large recovery of oil from laboratory flow models simulating oil-containing subterranean formations. Further, the use of diminishing concentrations of the polysaccharide B–1459 enables achieving a surprisingly large recovery of oil without using the relatively large quantity of polysaccharide B–1459 required for continuous injection of the initial, highest concentration of polysaccharide B–1459. The surprisingly large recovery of oil effected by employing both the specific solution of surfactant and the specific solution of thickening agent apparently is due to coaction of the two solutions. Expressed otherwise, the amount of additional oil, i.e., oil additional to the oil recovered by flooding water alone, that can be recovered from a laboratory flow model by employing both the specific solution of surfactant and the specific solution of thickening agent is greater than the sum of the amount of additional oil recovered by employing, singly, the specific solution of surfactant and, singly, the specific solution of thickening agent in separate laboratory flow models.

Description of specific embodiments

The petroleum sulfonates employed in the invention will lower the interfacial tension between a displacing aqueous phase and oil to less than 0.1 dyne per centimeter. They will reduce the interfacial tension to even lower values. For example, they will lower the interfacial tension below about 0.01 dyne per centimeter. A particularly preferred class of the petroleum sulfonates will lower the interfacial tension between a displacing aqueous phase and the oil in the formation to 0.001 dyne per centimeter or lower. These particularly preferred petroleum sulfonates are mixtures of petroleum sulfonates having a median molecular weight of from about 400 to about 430 but otherwise having the same molecular weight distribution as the mixture previously mentioned. The molecular weights of these petroleum sulfonates, as well as those mentioned above and those mentioned hereinafter, are the molecular weights of the petroleum sulfonates in the sodium form. Moreover, the term "molecular wegiht" should be understood to mean equivalent weight, which is defined as molecular weight per sulfonate group. The term "molecular weight" is used because it is commonly applied by manufacturers of petroleum sulfonates in describing their products.

Petroleum sulfonates are well known and it is not believed necessary to describe their method of preparation in detail here. Mixtures of petroleum sulfonates having the desired molecular weights may be obtained by sulfonating a petroleum fraction having molecular weights appropriate to give the desired molecular weights after sulfonation. Alternatively, commercially available petroleum sulfonates having known molecular weights and known average molecular weights may be mixed in the proper proportion to achieve a mixture having the desired molecular weights. The petroleum sulfonates may be natural petroleum sulfonates preparped by sulfonating fractions from a crude oil or refinery stream or synthetic petroleum sulfonates prepared by sulfonating alkyl aryl fractions synthesized in various chemical operations.

The solution of petroleum sulfonates injected into the subterranean formation may be an aqueous solution or a hydrocarbonaceous solution. Alternatively, both types of solutions may be injected into the subterranean formation. Particularly low interfacial tensions will be obtained where both types of solutions are injected into formation.

A concentration of petroleum sulfonates in employed in the solution thereof which will effect an interfacial tension between a displacing aqueous phase and the oil within the subterranean formation of less than about 0.1 dyne per centimeter. A concentration prior to injection of from about 0.01 to about 25 percent by weight in the solution is sufficient. Ordinarily, a concentration of from about 0.01 to about 0.5 percent by weight of petroleum sulfonates within the formation is adequate to effect the requisite interfacial tension. The petroleum sulfonates tend to be adsorbed on the surfaces of the pores of a subterranean formation with the higher molecular weight petroleum sulfonates being adsorbed preferentially to the lower molecular weight petroleum sulfonates. Accordingly, the leading edge of the petroleum sulfonate solution may have concentrations of petroleum sulfonate as high as from about 1 to about 5 percent by weight to compensate for the adsorption onto the subterranean formation of the higher molecular weight petroleum sulfonates.

Where an aqueous solution of the petroleum sulfonates is employed, the solution preferably contains other dissolved materials. For example, it is preferred that the solution contain at least 1 percent by weight of sodium chloride. The sodium chloride enhances the interfacial activity of the petroleum sulfonates. On the other hand, the solution should not contain in excess of 2 percent by weight of sodium chloride since concentrations of sodium chloride in excess of 2 percent by weight are chemically incompatible with the petroleum sulfonates. In this connection, the solution should be essentially free of salts having divalent cations since these are also chemically incompatible with the petroleum sulfonates. It is also preferred that the solution contain sodium borate, an alkaline complex phosphate such as tetrasodium pyrophosphate or sodium tripolyphosphate, or an alkali metal carbonate. As previously mentioned, the petroleum sulfonates tend to be adsorbed on the surfaces of the pores of a subterranean formation. Sodium borate, tetrasodium pyrophosphate, sodium tripolyphosphate and sodium carbonate each act as sacrificial inorganic additives to reduce the tendency of the petroleum sulfonates to be adsorbed. Two or more of the sacrificial inorganic additives may be employed if desired. Further, if desired, in place of or in addition to the sacrificial inorganic additives being contained in the aqueous solution of surfactant, a solution of sacrificial inorganic additive may be injected into the formation prior to the solution of surfactant.

The specific solution of surfactant is injected into the subterranean formation in an amount of from about 0.01 to about 0.2 pore volume.

The thickening agent, the polysaccharide B–1459, contains d-glucose, d-mannose, and d-glucuronic acid groups in the ratio 2.8:3.0:2.0, and it also contains from about 3 to about 3.5 percent by weight pyruvic acid and about 4.7 percent by weight of acetic acid. The acetic acid exists as the o-acetyl ester, whereas pyruvic acid is attached through a ketal linkage. The polysaccharide B–1459 is produced, as stated, by the action of bacterium *Xanthomonas campestris* NRRL B–1459, United States Department of Agriculture, on glucose. The glucose, which may be commercial glucose, is contained during the action in a well-aerated medium having a pH about 7 and containing organic nitrogen sources, dipotassium hydrogen phosphate, and appropriate trace elements. The action of the bacterium is one of fermentation and the preferred temperature during the fermentation is about 28° C. The fermentation is completed in about 96 hours or less. Bacterial cells and suspended impurities are removed from the fermentation product by centrifugation after adjusting the pH to from 5 to 6. The polysaccharide B-1459 is precipitated from the centrifuged product by adding salt and a low molecular weight alcohol thereto.

Polysaccharide B-1459 is a relatively standard product. Its molecular weight is estimated to be in the millions, judging from the fact that a 1 percent by weight aqueous solution of the polymer has a viscosity of 3,000 centiposes when measured at 25° C. on a Brookfield LVT Viscometer at 30 revolutions per minute.

A suitable polysaccharide B-1459 for use in the invention is commercially available under the trade name "Kelzan" from the Kelco Company, San Diego, California 92123.

The polysaccharide B-1459 is employed in the solution thereof in a concentration sufficient to impart to the solution a viscosity equal to that of the in situ oil. In rare instances, a concentration as small as 0.005 percent by weight will be satisfactory. Usually, however, a concentration of from about 0.01 to about 0.3 percent by weight is employed. The preferred concentration range is from about 0.03 to about 0.1 percent by weight. In rare instances in which it is desired to recover an unusually viscous crude oil, it may be desirable to employ as high as 2 percent by weight, or more, of the thickening agent in the solution.

The viscosity of solutions of the polysaccharide B-1459 is relatively stable over the pH range of 4 to 11. Preferably, the pH of the solution is maintained within the range of from about 7 to about 10.5.

The polysaccharide B-1459 is subject to bacterial decomposition after a time. Consequently, the solution containing the polysaccharide B-1459 loses some of its high viscosity after a period of time in the subterranean formation. This bacterial decomposition is mitigated by adding a bactericide, commonly called a preservative, to the solution of polysaccharide B-1459. The preferred bactericide is formaldehyde. The alkali metal chlorinated phenols, such as sodium pentachlorophenol, may also be employed as the bactericide.

The solution of the thickening agent contains diminishing concentrations of the thickening agent to achieve a graded viscosity between that of the oil in the formation and that of the flooding water injected therebehind. For example, if the gradation is to be accomplished in two steps, the first portion of the solution would contain the concentration of the thickening agent to impart to the solution a viscosity equal to that of the oil in the formation and the second portion of the solution could contain about one-half the concentration of thickening agent contained in the first portion of the solution. Similarly, if the gradation is to be accomplished in three steps, two portions of solution containing two-thirds and one-third, respectively, the concentration of the thickening agent in the first portion of the solution would be injected following the first portion. If the gradation is to be accomplished in ten steps, ten portions of solution, each containing a concentration of the thickening agent which is lower than the concentration in the preceding portion by an amount of 10 percent of the concentration in the first portion, would be injected following the first portion. Each portion of the solution of thickening agent may be considered to be a separate and distinct solution of the thickening agent. Moreover, a solution, or portion thereof, following the initial solution, or initial portion of solution, need not contain such concentration of thickening agent that the viscosity will be a particular fraction of the viscosity of the initial solution or initial portion of solution. It is only necessary that the succeeding solutions or portions of solution have an intermediate viscosity decreasing to that of the flooding water. If desired, the gradation may be accomplished in minute increments by continually reducing the concentration of the thickening agent as the solution is injected into the formation.

The solution of thickening agent is injected into the formation in the amount of between about 0.01 and 0.2 pore volume.

In one embodiment of the invention, the solution of surfactant is followed immediately by the solution of thickening agent. In a preferred embodiment of the invention, the solution of surfactant, where the solution is an aqueous solution, is combined with the solution of thickening agent. In this way, there is immediate coaction of the two solutions in displacing oil. In still another embodiment, a solution of a surfactant, followed immediately by a slug of water, and then followed by the solution of thickening agent may be employed.

As mentioned above, immediate coaction between the solutions of surfactant and thickening agent occurs when both solutions are combined. Coaction between the solution of surfactant and the solution of thickening agent, whether or not a slug of water is injected into the formation between the two solutions, occurs in part as a result of desorption of adsorbed petroleum sulfonates from the surfaces of the pores of the formation. The adsorption of the petroleum sulfonates on the surfaces of the pores of the formation is an equilibrium phenomenon. Desorption will occur when the liquid in contact with the surfaces of the pores of the formation contains insufficient petroleum sulfonates to provide an adsorption potential equal to or greater than the desorption potential. Thus, a solution of thickening agent following the solution of surfactant will desorb the surfactant and the surfactant will be contained in the solution of thickening agent permitting coaction to occur. The same thing occurs where a slug of water is injected into the formation between the two solutions, the water and the solution of thickening agent commingling in the formation and each desorbing surfactant from the formation. In this connection, the sodium chloride content of a liquid in contact with the surfaces of the pores of the formation has an influence upon the desorption of petroleum sulfonates, the lower the concentration of sodium chloride, the greater the desorption of the petroleum sulfonates. Thus, the slug of water injected into the formation between the solution of surfactant and the solution of thickening agent should have a concentration of sodium chloride lower than that of the solution of surfactant. Preferably, fresh water is employed where the formation is such that fresh water will not have a deleterious effect on injectivity. Where the solution of surfactant is injected into the formation subsequent to the solution of thickening agent, coaction occurs to an insignificant extent if at all. In this procedure, the soltuion of surfactant continually loses surfactant by adsorption, and when commingling within the formation of the two solutions occurs, the solution of surfactant will have been essentially depleted of the petroleum sulfonates, particularly the high molecular weight components thereof.

The injection of a single solution of both surfactant and thickener or the injection of a solution of surfactant followed by a solution of thickener, with or without the injection of an intermediate slug of water, may be regarded as one cycle. More than one cycle may be employed, however, where desired.

The equipment which is conventionally employed in carrying out a waterflood may be employed in carrying out the method of the invention. For example, the hydrocarbon products which are produced from the production means, particularly during the latter stages of the method, may be emulsified with the aqueous phase. This emulsion may be broken by conventional heat-treating apparatus. The aqueous phase effluent from the heat-treating apparatus may be recycled to the injection means.

The following example will be illustrative of the invention.

An areal flow model representing one-quarter of a conventional five-spot well pattern was constructed. This model was in the form of a square, transparent plastic container having inside dimensions of 8 x 8 x ¼ inches and provided with fluid entry and exit means representing an injection and a production well, respectively, and was packed with sand produced from Section 67 of the Loma Novia Field, Duval County, Tex. A thin, plastic sheet sealed between the cover plate and the sand in the plastic container served both as a sealing gasket and an inflatable diaphragm. A fluid pressure of 40 pounds per square inch applied between the plastic sheet and the cover plate of the model served to keep the sand well compacted and to prevent bypassing of fluids along the surface boundary. The sand pack had a porosity of 42.9 percent, a permeability of 7,300 millidarcies, and a pore volume of 112.5 cubic centimeters.

The sand was saturated with water from the Loma Novia Field by a vacuum saturation technique. Crude oil from the Loma Novia Field was then passed through the model until no more water was being removed from the sand pack by the oil. At this point, the interstitial water saturation of the sand pack was 26.3 percent. The measured viscosities of the crude oil and the water at room temperature (77° C.) were 9.5 and 0.9 centipoises, respectively. To simulate a waterflood carried out without employing a surfactant or thickening agent, and to provide a control, the model was waterflooded by passing through it the water from the Loma Novia Field until no more oil was being removed from the sand pack by the water. This point was reached when 15 pore volumes of water had been passed through the sand pack. Oil recovery by this waterflood was 46.9 percent, leaving a residual oil value of 26.8 percent of the pore volume.

Following the waterflood, solutions of surfactant and solutions of thickening agent were passed into the sand pack to simulate a procedure in accordance with the invention. The surfactant was a mixture of petroleum sulfonates having a median molecular weight of from about 400 to about 430, having molecular weights from 290 to 590, no more than 10 percent by weight thereof having an average molecular weight less than 290, and no more than 15 percent thereof having an average molecular weight greater than 590. This mixture was in the amount of 1.65 percent by weight of the solution. The solution of surfactant also contained 0.1 percent by weight of sodium carbonate and 0.1 percent by weight of sodium tripolyphosphate as sacrificial inorganic additives for the petroleum sulfonates. Also, two solutions of sacrificial inorganic additive were passed into the sand pack prior to the surfactant solution. The thickening agent was Kelzan and was in the amount of 0.08 percent by weight of the solution. The solution of Kelzan contained 0.2 percent by weight of formaldehyde as a bactericide.

The schedule of passing the solutions, and the amounts thereof, into the sand pack were as follows:

(1) 0.1 pore volume of water from the Loma Novia Field containing 2.64 percent by weight of sodium carbonate, (2) 0.1 pore volume of water from the Loma Novia Feld containing 0.1 percent by weight of sodium carbonate and 0.1 percent by weight of sodium tripolyphosphate, (3) 0.1 pore volume of the surfactant solution, (4) 0.1 pore volume of water from the Loma Novia Field containing 0.08 percent by weight of Kelzan, (5) a series of 0.1 pore volumes of water from the Loma Novia Field containing Kelzan, the amount of Kelzan in each being reduced by 10 percent of the amount of Kelzan in solution (4) to achieve a graded viscosity down to that of the water from the Loma Novia Field, and (6) water from the Loma Novia Field until no more oil was being removed from the sand pack.

A total of 8 pore volumes of liquid was passed through the sand pack. The additional oil recovery was 8.2 percent of the pore volume or 30.5 percent of the volume of oil in place at the conclusion of the preceding waterflood.

Having thus described the invention, it will be understood that such description has been given by way of illustration and example and not by way of limitation, reference for the latter purpose being had to the appended claims.

What is claimed is:

1. In a method of recovering oil from a subterranean formation containing oil and having an injection means and a production means wherein flooding water is injected into said subterranean formation, the improvement comprising the steps of:

(a) injecting through an injection well and into said subterranean formation in solution a mixture of petroleum sulfonates having a median molecular weight of from about 375 to about 430, having molecular weights from 290 to 590, no more than 10 percent by weight thereof having an average molecular weight less than 290, and no more than 15 percent by weight thereof having an average molecular weight greater than 590 in an amount effective to lower the interfacial tension between an aqueous phase in said formation and said oil in said formation to below 0.1 dyne per centimeter and, in aqueous solution, polysaccharide B–1459, a heteropolysaccharide produced by fermentation of glucose by bacterium *Xanthomonas campestris*, in a concentration sufficient to impart a viscosity to the solution containing the polysaccharide B–1459 substantially equal to that of said oil, (b) subsequently injecting through said injection well and into said subterranean formation at least one other time, in aqueous solution, polysaccharide B–1459 in a concentration sufficient to impart to the solution containing the polysaccharide B–1459 a viscosity intermediate to that of said oil and said flooding water, (c) subsequently injecting through said injection well and into said subterranean formation said flooding water, and (d) producing oil from said subterranean formation through a production well to the surface of the earth.

2. The method of claim 1 wherein said mixture of petroleum sulfonates has a median molecular weight of from about 400 to about 430.

3. The method of claim 1 wherein said mixture of petroleum sulfonates is in an aqueous solution.

4. The method of claim 3 wherein said mixture of petroleum sulfonates and said polysaccharide B–1459 are in the same solution.

5. The method of claim 3 wherein said mixture of petroleum sulfonates and said polysaccharide B–1459 are in different solutions with said aqueous solution of polysaccharide B–1459 being injected through said injection well and into said subterranean formation subsequent to said aqueous solution of petroleum sulfonates.

6. The method of claim 5 wherein a slug of water is injected through said injection well and into said subterranean formation intermediate to said aqueous solutions of petroleum sulfonates and said polysaccharide B–1459.

7. The method of claim 1 wherein said mixture of petroleum sulfonates is in a hydrocarbonaceous solution with said polysaccharide B–1459 in aqueous solution being injected through said injection well and into said subterranean formation subsequent to said hydrocarbonaceous solution of petroleum sulfonates.

8. The method of claim 1 wherein said solution of polysaccharide B–1459 in a concentration sufficient to impart a viscosity to said solution substantially equal to that of said oil and said solution of polysaccharide B–1459 in a concentration sufficient to impart a viscosity to said solution intermediate to that of said oil and said flooding water is a single solution wherein the first portion thereof injected through said injection well and into said subterranean formation contains said polysaccharide B–1459 in a concentration sufficient to impart to said first portion of said solution a viscosity substantially equal to that of said oil and wherein a subsequent portion thereof injected through said injection well and into said subterranean formation contains said polysaccharide B–1459 in a concentration sufficient to impart to said portion of said solution a viscosity intermediate to that of said oil and said flooding water.

9. The method of claim 8 wherein said polysaccharide B–1459 is in a concentration of from about 0.01 to about 0.3 percent by weight of said initial portion of said solution.

10. The method of claim 8 wherein said concentration of said polysaccharide B–1459 is diminished in proportion to the number of portions of polysaccharide B–1459 injected through said injection well and into said subterranean formation between said initial portion of said solution and said flooding water.

11. The method of claim 10 wherein ten portions of solution of polysaccharide B–1459 are injected between said initial portion of said solution and said flooding water and each successive portion contains a concentration which is lower than the concentration in the preceding portion by an amount of 10 percent of the concentration in the initial portion.

12. The method of claim 1 wherein said solution of polysaccharide B–1459 in a concentration sufficient to impart a viscosity to said solution substantially equal to that of said oil and said solution of polysaccharide B–1459 in a concentration sufficient to impart a viscosity to said solution intermediate to that of said oil and said flooding water are separate first and at least one other solution.

13. The method of claim 12 wherein said polysaccharide B–1459 is in a concentration of from about 0.01 to about 0.3 percent by weight of said at least one other solution.

References Cited

UNITED STATES PATENTS

| | | | |
|---|---|---|---|
| 2,839,466 | 6/1958 | Shock et al. | 252—8.55 |
| 3,199,586 | 8/1965 | Henderson et al. | 166—9 |
| 3,208,518 | 9/1965 | Patton | 166—9 |
| 3,258,071 | 6/1966 | Yu Shen et al. | 166—9 |
| 3,283,812 | 11/1966 | Ahearn et al. | 166—9 |
| 3,288,213 | 11/1966 | King et al. | 166—9 |
| 3,302,713 | 2/1967 | Ahearn et al. | 166—9 |
| 3,305,016 | 2/1967 | Lindblom et al. | 166—9 |
| 3,361,313 | 1/1968 | Riggs et al. | 166—9 X |
| 3,366,174 | 1/1968 | Ferrell et al. | 166—9 |
| 3,373,808 | 3/1968 | Patton | 166—9 |

OTHER REFERENCES

Slobod et al., "Use of a Graded Viscosity Zone To Reduce Fingering in Miscible Phase Displacements," Producers Monthly, August 1960, (pp. 12, 14–16, 18 and 19).

STEPHEN J. NOVOSAD, *Primary Examiner.*

UNITED STATES PATENT OFFICE
CERTIFICATE OF CORRECTION

Patent No. 3,434,542  March 25, 1969

Billy J. Dotson et al.

It is certified that error appears in the above identified patent and that said Letters Patent are hereby corrected as shown below:

Column 2, line 17, "know" should read -- known --. Column 3, line 61, "wegiht" should read -- weight --. Column 4, line 3, "perpared" should read -- prepared --; line 12, before "formation" insert -- the --; line 14, "in" should read -- is --. Column 5, line 63, "ten portions" should read -- nine portions --. Column 6, line 55, "soltuion" should read -- solution --. Column 7, line 63, "Feld." should read -- Field --.

Signed and sealed this 31st day of March 1970.

(SEAL)
Attest:

Edward M. Fletcher, Jr.  WILLIAM E. SCHUYLER, JR.
Attesting Officer  Commissioner of Patents